United States Patent
Grudd et al.

(10) Patent No.: US 12,362,548 B2
(45) Date of Patent: Jul. 15, 2025

(54) TRANSIT FOR PASSING AT LEAST ONE CABLE AND/OR AT LEAST ONE METALLIC PIPE

(71) Applicant: Roxtec AB, Karlskrona (SE)

(72) Inventors: Mikael Grudd, Karlskrona (SE); Mathias Falk, Karlskrona (SE)

(73) Assignee: Roxtec AB, Karlskrona (SE)

( * ) Notice: Subject to any disclaimer, the term of this patent is extended or adjusted under 35 U.S.C. 154(b) by 149 days.

(21) Appl. No.: 17/786,581

(22) PCT Filed: Dec. 10, 2020

(86) PCT No.: PCT/SE2020/051190
§ 371 (c)(1),
(2) Date: Jun. 17, 2022

(87) PCT Pub. No.: WO2021/126047
PCT Pub. Date: Jun. 24, 2021

(65) Prior Publication Data
US 2023/0034302 A1    Feb. 2, 2023

(30) Foreign Application Priority Data
Dec. 19, 2019  (SE) .................... 1951510-5

(51) Int. Cl.
*H02G 3/22*  (2006.01)
*F16L 5/08*  (2006.01)
*H01R 9/05*  (2006.01)

(52) U.S. Cl.
CPC ............... *H02G 3/22* (2013.01); *F16L 5/08* (2013.01); *H01R 9/0512* (2013.01)

(58) Field of Classification Search
CPC ........ H02G 3/22; H02G 3/0666; H01R 13/52; H01R 13/5205; H01R 13/58;
(Continued)

(56) References Cited

U.S. PATENT DOCUMENTS 4,026,619 A * 5/1977 Gillemot ................ H01R 4/646
                                                       439/799
4,677,253 A * 6/1987 Blomqvist ............... H02G 3/22
                                                       174/362
(Continued)

FOREIGN PATENT DOCUMENTS

CN      102544879 A     7/2012
CN      105071321 A    11/2015
(Continued)

OTHER PUBLICATIONS

English Machine Translation of DE3105182 provided with Office Action (Year: 1982).*
(Continued)

*Primary Examiner* — Roshn K Varghese
(74) *Attorney, Agent, or Firm* — Merchant & Gould P.C.

(57) ABSTRACT

A transit for passing at least one cable (1) and/or at least one metallic pipe through an opening in a partition. The transit comprises a part receiving said at least one cable (1) or pipe and means are provided for connecting an exposed shield or armour (2) of the cable (1) or the metallic pipe to a surrounding potential. A verification point for verifying the connection to the surrounding potential is placed outside the transit. Said verification point is given by a part in contact with the cable shield or armour (2) of the cable (1) or the pipe inside the transit.

20 Claims, 3 Drawing Sheets

(58) Field of Classification Search
CPC ............ H01R 9/0512; H01R 13/65914; H01R 4/646; F16L 5/00; F16L 5/08; F16L 11/127; G01R 31/52; G01R 31/58
See application file for complete search history.

(56) References Cited

U.S. PATENT DOCUMENTS

| | | | |
|---|---|---|---|
| 4,764,422 A * | 8/1988 | Hill | H02G 3/22 |
| | | | 428/322.2 |
| 5,493,068 A | 2/1996 | Klein et al. | |
| 5,747,983 A | 5/1998 | Lara et al. | |
| 6,890,191 B1 | 5/2005 | Thorburn | |
| 2012/0071029 A1* | 3/2012 | Millevik | F16L 5/14 |
| | | | 439/607.25 |

FOREIGN PATENT DOCUMENTS

| | | | |
|---|---|---|---|
| DE | 3105182 A1 * | 9/1982 | |
| EP | 0590410 A1 | 4/1994 | |
| EP | 1484541 A1 | 12/2004 | |
| EP | 2617112 B1 | 1/2020 | |
| FR | 2652207 A1 | 3/1993 | |
| GB | 2186440 A | 8/1987 | |
| JP | S5730275 A | 2/1982 | |
| JP | H03282268 A | 12/1991 | |
| JP | 2008-542999 A | 11/2008 | |
| WO | 2018/193420 A1 | 10/2018 | |

OTHER PUBLICATIONS

PCT Search Report for PCT Application No. PCT/SE2020/051190 mailed Feb. 16, 2021 (4 pages).
PCT Written Opinion for PCT Application No. PCT/SE2020/051190 mailed Feb. 16, 2021 (7 pages).
Swedish Search Report for SE Application No. 1951510-5 mailed Jul. 31, 2020 (2 pages).
Office Action dated Oct. 1, 2024 has been issued in the corresponding Japanese Patent Application No. 2022-536674 (10 pages including English Translation).

* cited by examiner

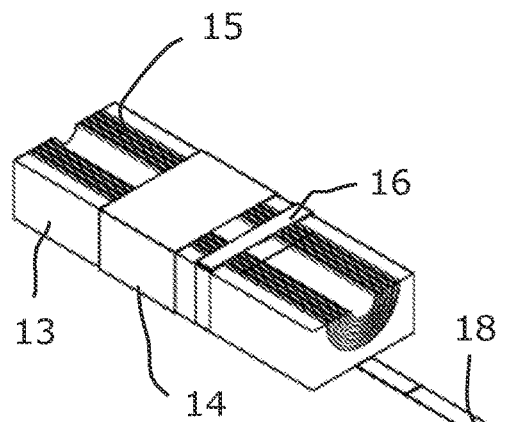
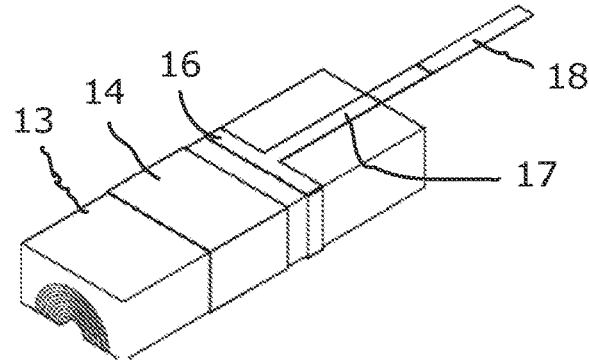
Fig. 6　　　Fig. 7
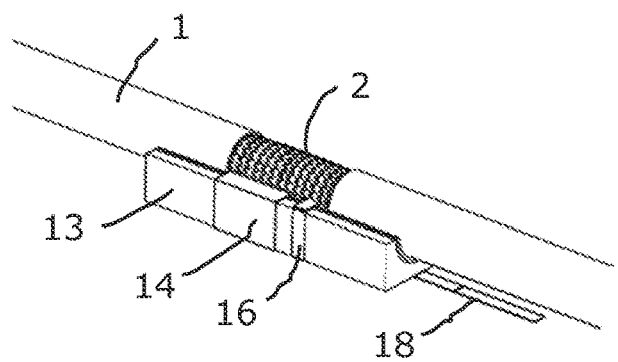
Fig. 8
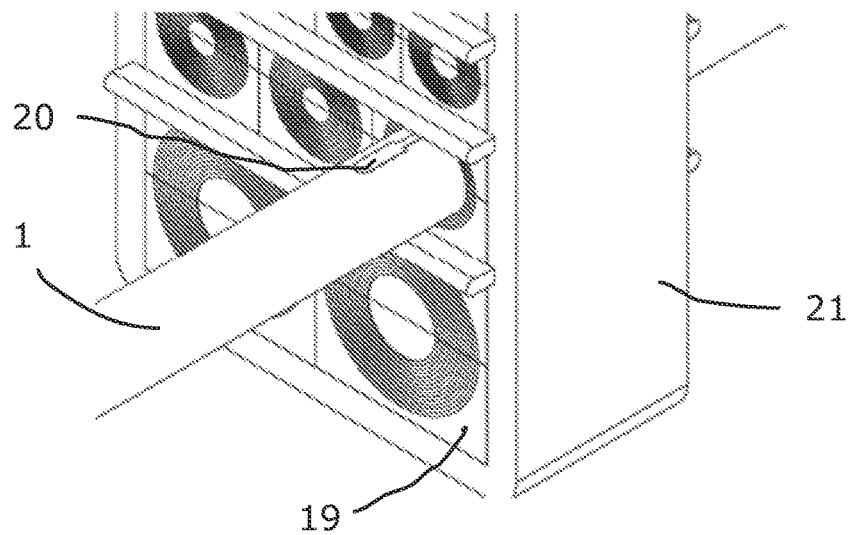
Fig. 9

TRANSIT FOR PASSING AT LEAST ONE CABLE AND/OR AT LEAST ONE METALLIC PIPE

This application is a National Stage Application of PCT/SE2020/051190, filed 10 Dec. 2020, which claims benefit of Serial No. 1951510-5, filed 19 Dec. 2019 in Sweden, and which applications are hereby incorporated by reference in their entireties. To the extent appropriate, a claim of priority is made to each of the above disclosed applications.

TECHNICAL FIELD

The present invention concerns a transit for passing at least one cable or metallic pipe through an opening in a partition.

BACKGROUND

Transits are used for sealing in many different environments and are placed at partitions of cabinets, technical shelters, junction boxes, houses, ships and machines. They are used in different industrial environments, such as automotive, telecom, power generation and distribution, as well as marine and offshore.

The transits may have to seal against fluid, gas, fire, rodents, dust, moisture etc. and may receive cables for electricity, communication, computers etc. or pipes for different gases or liquids such as water, compressed air, hydraulic fluid and cooking gas.

The transit through a partition may have many different embodiments. It could be a rectangular or circular frame receiving a number of modules. Which frames normally are fastened in an opening of the partition by means of welding or bolting. It could be a cylindrical seal, often intended for only one cable or pipe. Such a cylindrical seal may be received directly in an opening of the partition or in a sleeve fastened in an opening of the partition. There are also cylindrical seals that receives a number of modules.

In some cases, an electric connection is provided between a cable shield or armour and a surrounding potential, which often is ground or earth. Such an electric connection may also be provided for a metallic pipe. To connect a shielded cable or an armoured cable the outer sheath of the cable is removed in a limited area, whereby the shield or armour is exposed.

Electrically shielded or armoured cables, have several applications. The purpose may be to maintain the quality of the signal conducted through the shielded or armoured cable, or to shield the surroundings from electromagnetic interference (EMI) caused by the signal conducted through the cable. According to codes for electrical installation and several national and international standards, such shielded or armoured cables may be grounded as they pass a structure or is terminated, e.g. for the purposes of bonding the cable with the surroundings or to prevent radio frequency interference (RFI) from passing through a bulkhead or other partition.

Shield and armour of cables have normally different functions. The main purpose of a shield is to stop electromagnetic fields to reach the inner conductor or prevent that the fields escapes. The main purpose of an armour is to act as a mechanical protection in the cable. The armour should be bond to the surrounding potential as a security in case the cable is broken. Thus, depending of type of cable, it may have a shield or an armour.

To ensure functionality the electrical resistance between the cable shield, cable armour or the metallic pipe and a surrounding frame that acts as a potential equalization bar must be verified. The most common way is to use an electric multimeter or microohm meter. To enable this measurement technique the cable shield, cable armour or metallic pipe must be exposed to allow a direct electrical connection, in the form of a verification point. In many applications this is not possible due to requirement of environmental protection of the cable or pipe and the transit receiving it. In many cases the cable armour or pipe metal is exposed only inside the module and the environmental protection is realized with a rubber sealing. This type of system does not offer an accessible verification point and the functionality is of this reason hard to verify when installed.

SUMMARY

In view of the above one object of the present invention is to give a verification point outside the transit.

The objects of the invention have been achieved by the novel technology having the features set forth in the appended independent claim. Different embodiments are defined in the dependent claims.

One idea is to have some type of solutions to access the verification point outside the system without affecting the environmental protection of the system. The idea is to extend the verification point of the cable shield, armour or pipe outside the modular sealing system via an electrical conductor.

The solution can be realized in several different ways. One is to have the functionality built-in the modular system. Another solution is to have an add-on to the cable or pipe.

Further objects and advantages of the present invention will be obvious to a person skilled in the art when reading the detailed description below.

BRIEF DESCRIPTION OF THE DRAWINGS

The invention will be described further below by way of example and with reference to the enclosed drawings. In the drawings:

FIG. 6 is a perspective view of a module half provided with an electrical conductor, FIG. 7 is a perspective view of the module half of FIG. 6 taken from another direction, FIG. 8 is a schematic view showing a cable received in the module half of FIGS. 6 and 7, FIG. 9 is a schematic view of a cable received in a transit.

DETAILED DESCRIPTION

Figure 1:
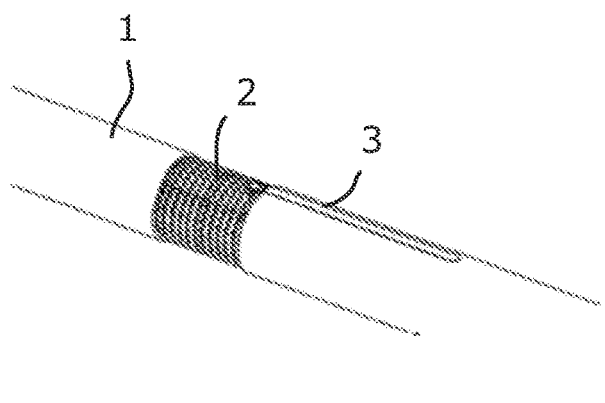
FIG. 1 is a perspective view of a cable provided with an electrical conductor.
Figure 2:
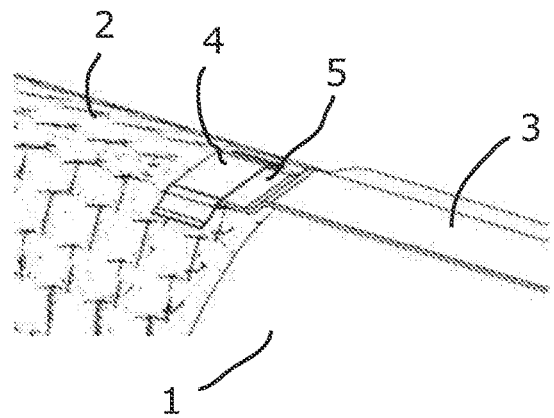
FIG. 2 is an enlarged view showing means for fastening of the electrical conductor of FIG. 1 to the cable.

In FIGS. 1 and 2 a cable 1 is shown with an armour 2 exposed in an area. For ease of description the term "armour" will be used as a general term. Thus, "armour" is intended to also cover "shield" or "metallic pipe". The exposed armour 2 of the cable 1 is to be placed inside a sealed transit of some kind, in order for connecting the armour 2 of the cable 1 to a potential, normally ground. An electrical conductor 3 is fastened to the armour 2 at a fastening point. In one embodiment a clamp 4 is fastened on the armour 2, for instance by welding or soldering. The electrical conductor 3 has a lower end 5 inserted under the clamp 4. The lower end 5 is bent downwards from the rest of the electrical conductor 3 to take up the difference in diameter between the armour 2 and a sheath of the cable 1. In an alternative embodiment the lower end 5 is fastened directly on the armour 2, such as by welding, soldering, self-adhesive tape or conductive glue. In some embodiments the electrical conductor 3 is held in place by the force created when compressing the system receiving the cable or pipe. The electrical conductor 3 is made of an electrical conducting material and extends along the cable 1 in a longitudinal direction. The electrical conductor 3 is made of a thin material in order not to compromise the sealing function of the transit. The electrical conductor 3 is long enough to extend outside the transit. The end of the electrical conductor 3 extending outside the transit will form a verifying point, at which a multimeter or the like may be used to verify the functionality of the grounding of armour 2 of the cable 1.

Figure 3:
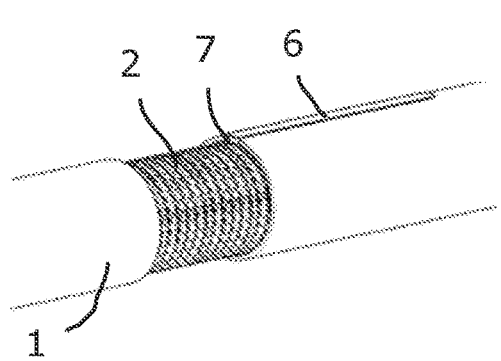
FIG. 3 is a perspective view of a cable provided with an electrical conductor according to another embodiment.

In FIG. 3 an electrical conductor 6 is shown in contact with the armour 2 of the cable 1. This electrical conductor 6 only differs from the electrical conductor 3 described above in the way it is connected to the armour 2. The electrical conductor 6 has a bent end 7. The outer part of said bent end 7 is bent 180° and is placed between the sheath and the armour 2 of the cable 1, at one side of the exposed area of the armour 2. The bent end 7 is bent to take up the difference in diameter between the armour 2 and the sheath of the cable 1. In use the electrical conductor 6 will extend outside the transit to present a verification point.

Figure 4:
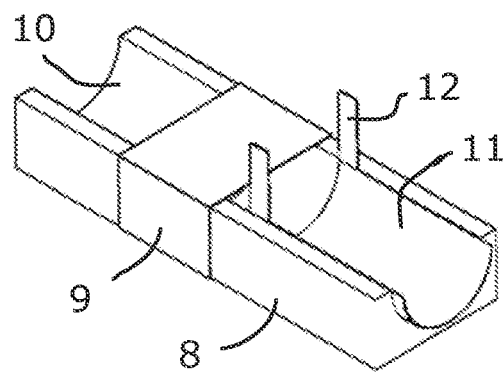
FIG. 4 is a perspective view of a module half provided with a conductive layer.
Figure 5:
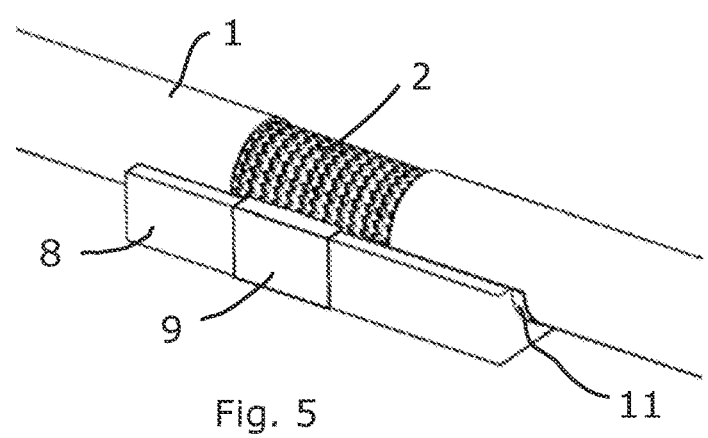
FIG. 5 is a schematic view showing a cable received in the module half of FIG. 4.

In some embodiments the cable 1 is placed in a module, which module together with a number of further modules are placed inside a frame. In FIG. 4 one example of a module half 8 is shown. The module half has a bonding conductor, denoted as conductive tape 9 further on but can also be realised with metallic braid, mesh or sheet, for contact with the shield or armour 2 of the cable 1. Before use, the conductive tape 9 extends all around the module half 8. The module half 8 has a semi-cylindrical groove 10. The conductive tape 9 has two ends placed above each other above the semi-cylindrical groove 10. In use the ends of the conductive tape 9 are bent down into the semi-cylindrical groove 10 before the cable 1 is placed in the semi-cylindrical groove 10 of the module half 8. The cable 1 is placed with the armour 2 in contact with the bent down ends of the conductive tape 9. At one side of the conductive tape 9 a conductive layer 11 is placed in the semi-cylindrical groove 9. One end of the conductive layer 11 is placed adjacent the conductive tape 9 and the other end of the conductive layer 11 protrudes outside an end of the module half 8. At the part of the conductive layer 11 adjacent the conductive tape 9, said conductive layer 11 has two flaps 12 placed on opposite sides. Said flaps 12 are bent down into the semi-cylindrical groove 10 to be placed below the armour 2 when the cable 1 is placed in the semi-cylindrical groove 10. In the embodiment of FIGS. 4 and 5 the conductive layer 11 is made of an electrically conductive material. A module is formed in that two module halves 8 are placed on top of each other, whereby a cylindrical opening is formed by the semi-cylindrical grooves 10 of the module halves 8. The cable 1 is to be placed in said cylindrical opening formed in the module. The part of the conductive layer 11 protruding outside the module half 8 will form a verification point.

In FIGS. 6 and 7 a module half 13 is shown having a conductive tape 14 or other bonding conductor. A number of peelable layers 15 are placed in a semi-cylindrical groove of the module half 13. The peelable layers 15 are peeled off for adaptation to the outer diameter of the cable 1 or pipe to be received. The peelable layers 15 are divided into several sections, as the number of layers 15 to be peeled off is not the same for the area at which the armour 2 is exposed and the parts of the cable 1 with the sheath intact. The conductive tape 14 has two ends placed on top of each other above the semi-cylindrical groove. Said ends of the conductive tape 14 are folded upwards before any layers 15 are peeled off. When the appropriate amount of layers 15 have been peeled off, the ends of the conductive tape 14 are folded down into the semi-cylindrical groove on top of any remaining layers 15. The cable 1 is then placed in the semi-cylindrical groove with the exposed armour 2 placed on the conductive tape 14 inside the semi-cylindrical groove. An electrical conductor is shown, having somewhat of a T-like shape. A transversal electrical conductor part 16 surrounds the module half 13. The electrical conductor is made of an electrically conductive material and is relatively thin in order not to jeopardize the sealing function of the transit. On the side of the module half 13 opposite the semi-cylindrical groove the electrical conductor has an axially extended electrical conductor part 17, which is integrated with the transversal electrical conductor part 16. A free end 18 of the axially extended conductor part 17 protrudes outside one end of the module half 13. Said free end 18 will form a verification point. The transversal electrical conductor part 16 has two ends placed on top of each other above the semi-cylindrical groove. Said ends of the transversal electrical conductor part 16 are folded upwards before removing any of the peelable layers 15. The ends of the transversal conductor part 16 is then folded down into the semi-cylindrical groove before the cable 1 is placed in said semi-cylindrical groove. The free end 18 of the axially extended electrical conductor part 17 can be equipped with folding lines allowing folding of the free end 18 can be folded onto the module if the module half 13 is not equipped with a cable or pipe.

Even though peelable layers 15 are only shown in connection with the module half 13 of FIGS. 6 and 7, a person skilled in the art realizes that also the module half 8 of FIG. 4 may be provided with peelable layers.

Either only one module half 8, 13 or both module halves 8, 13 of a formed module have a conductive layer 11 or other electrical conductor 16, 17.

A person skilled in the art realizes that the different embodiment described above will function with a shielded cable and a metallic pipe as well as the cable 1 with an armour as described above.

The cable 1 having an electrical conductor 3 as shown in FIG. 1 or an electrical conductor 6 as shown in FIG. 3, may be placed in a module half having a conductive tape 9, 11, as described for the module halves 8, 13 shown in FIGS. 4, 6 and 7. Thus, in such instances there is no need for any conductive layer 11 or other conductive parts 16, 17, 18 arranged at the module half 8, 13.

Figure 10:
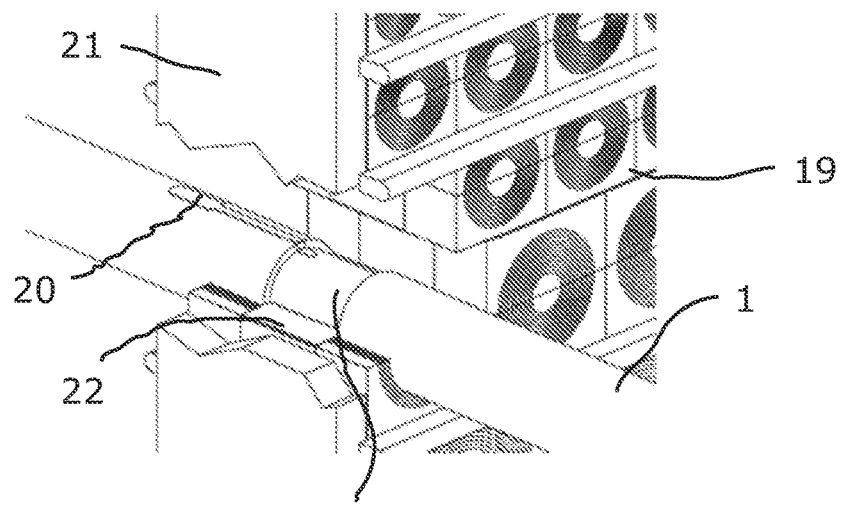
FIG. 10 is a detailed view corresponding with FIG. 7 and partly cut open.

In FIGS. 9 and 10 the cable 1 is shown received in a transit, which transit comprises a frame 21 inside which a number of modules 19 are received. The transit also comprise a compression means (not shown) inside the frame 21. The cable 1 has an electrical conductor 20 fastened at one end to the exposed armour 2 of the cable 1. The module has a conductive tape 22 in contact with the armour 2 of the cable 1. When the module 19 is received with the cable 1 inside the frame, the electrical conductor 20 will project outside the module 19. Thus, the electrical conductor 20 will give a verification point outside the transit. The electrical conductor 22 differs from the electrical conductors 3, 6 described in connection with FIGS. 1-3 in that a free end of the electrical conductor 22 is broader than the rest of the electrical conductor 22.

Figure 11:
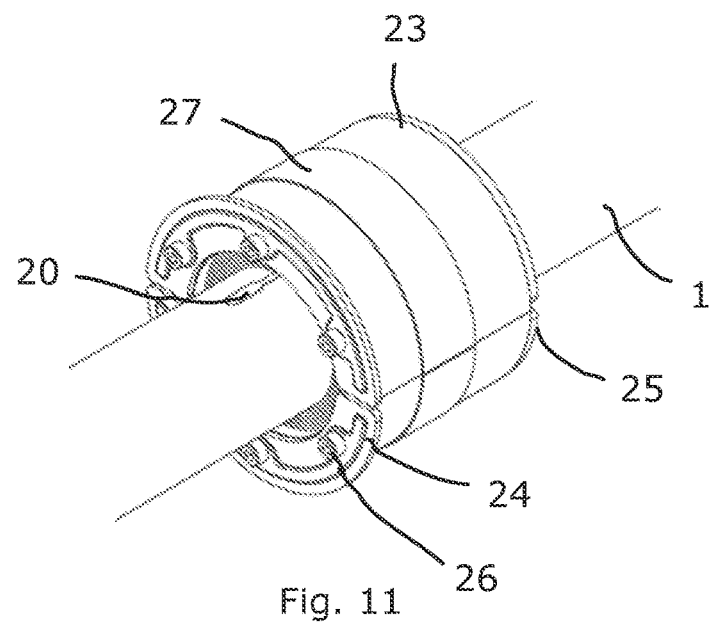
FIG. 11 is a perspective view of a transit in the form of a cylindrical seal.
Figure 12:
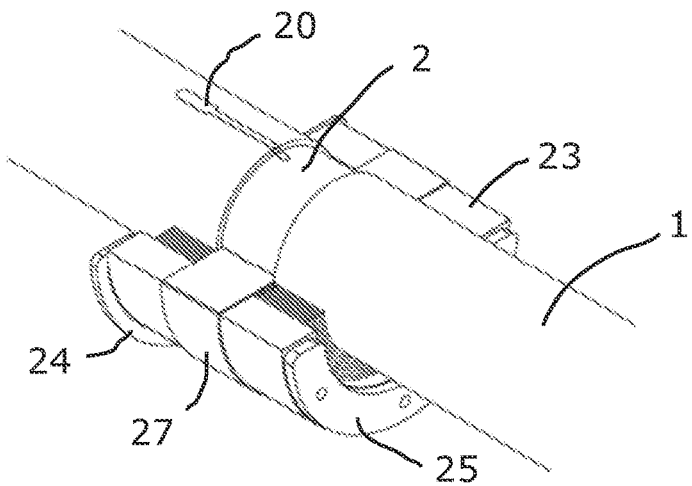
FIG. 12 is a perspective view of one half of the cylindrical seal of FIG. 11.

In FIGS. 11 and 12 the cable 1 is shown received inside a transit in the form of a round seal formed of two seal halves 23. Fittings 24, 25 are placed at opposite ends of the seal. In use the seal is compressed in axial direction in that the fittings are forced in direction towards each other by means of screws 26. The screws 26 go through openings in one of the fittings 24 and openings in the seal and ends in threaded openings in the other fitting 24. A conductive tape 27 of the seal is placed in contact with the exposed armour 2 of the cable 1. An electrical conductor 20 is fastened with one end to the exposed armour 2 of the cable 1. In use one end of the electrical conductor 20 will extend outside the seal, giving a verification point outside the transit. As stated above, the different electrically conductive parts are made of an electrically conductive material, such as copper or stainless steel.

The invention claimed is:

1. A transit for passing at least one cable or at least one metallic pipe through an opening in a partition, which transit comprises:
   a part receiving said at least one cable or pipe;
   a bonding conductor connecting a shield or armour of the cable or the metallic pipe to a surrounding potential; and
   an electrical conductor in contact with the shield or armour of the cable or the metallic pipe inside the transit and extending to an outside of the transit to provide a verification point placed outside the transit for verifying the connection of the shield or armour of the cable or the metallic pipe to the surrounding potential by the bonding conductor,
   wherein the electrical conductor is spaced from the bonding conductor,
   wherein the part receiving at least one cable or metallic pipe is a module, formed of two module halves, wherein each module half has a semi-cylindrical groove and the bonding conductor in the form of a conductive tape, metallic braid, mesh or sheet surrounding the module half,
   wherein at least one of said module halves the electrical conductor to be in contact with the shield or armour of the cable or with the metallic pipe and forms the verification point outside the transit, and
   wherein the electrical conductor is a conductive layer placed in the semi-cylindrical groove, wherein one end of the conductive layer is placed with a gap to the bonding conductor, and wherein the conductive layer protrudes outside one end of the module half.

2. The transit of claim 1, wherein one end of the electrical conductor is attached at the shield or armour of the cable or at the pipe, wherein the electrical conductor extends in a longitudinal direction along the cable or the pipe and wherein an end of the electrical conductor opposite the end attached to the cable or pipe forms the verification point.

3. The transit of claim 2, wherein the end of the electrical conductor attached to the shield or armour or the pipe is attached by means of welding, soldering, self-adhesive tape, conductive glue or by force created when compressing the transit.

4. The transit of claim 2, wherein the end of the electrical conductor attached to the shield or armour or the pipe is inserted under a clamp attached to the shield or armour of the cable.

5. The transit of claim 2, wherein the end of the electrical conductor attached to the shield or armour or the pipe is bent and placed under a jacket of the cable.

6. The transit of claim 1, wherein the conductive layer has two flaps placed at an end closest to the bonding conductor.

7. The transit of claim 1, wherein the electrical conductor comprises a transversal electrical conductor part surrounding the module half and placed with a gap to the bonding conductor, and an axial electrical conductor part integrated with the transversal electrical conductor part and wherein the axial connector part has a free end protruding outside one end of the module half.

8. The transit of claim 7, wherein two ends of the transversal electrical conductor part are placed on top of each other above the semi-cylindrical groove.

9. The transit of claim 1, wherein a number of peelable layers are placed in the semi-cylindrical groove of the module half.

10. The transit of claim 1, further comprising a frame, received in the opening of the partition, and a number of modules placed inside the frame together with a compression unit.

11. The transit of claim 1, wherein the transit has a form of a circular seal placed directly in an opening of the partition or in a sleeve placed in an opening of the partition.

12. A transit for passing at least one cable or at least one metallic pipe through an opening in a partition, which transit comprises:
    a part receiving said at least one cable or pipe;
    a bonding conductor connecting a shield or armour of the cable or the metallic pipe to a surrounding potential; and
    an electrical conductor in contact with the shield or armour of the cable or the metallic pipe inside the transit and extending to an outside of the transit to provide a verification point placed outside the transit for verifying the connection of the shield or armour of the cable or the metallic pipe to the surrounding potential by the bonding conductor,
    wherein the electrical conductor is spaced from the bonding conductor,
    wherein the part receiving at least one cable or metallic pipe is a module, formed of two module halves, wherein each module half has a semi-cylindrical groove and the bonding conductor in the form of a conductive tape, metallic braid, mesh or sheet surrounding the module half,
    wherein at least one of said module halves the electrical conductor to be in contact with the shield or armour of the cable or with the metallic pipe and forms the verification point outside the transit, and
    wherein the electrical conductor comprises a transversal electrical conductor part surrounding the module half and placed with a gap to the bonding conductor, and an axial electrical conductor part integrated with the transversal electrical conductor part and wherein the axial connector part has a free end protruding outside one end of the module half.

13. The transit of claim 12, wherein one end of the electrical conductor is attached at the shield or armour of the cable or at the pipe, wherein the electrical conductor extends in a longitudinal direction along the cable or the pipe and wherein an end of the electrical conductor opposite the end attached to the cable or pipe forms the verification point.

14. The transit of claim 13, wherein the end of the electrical conductor attached to the shield or armour or the pipe is attached by means of welding, soldering, self-adhesive tape, conductive glue or by force created when compressing the transit.

15. The transit of claim 13, wherein the end of the electrical conductor attached to the shield or armour or the pipe is inserted under a clamp attached to the shield or armour of the cable.

16. The transit of claim 13, wherein the end of the electrical conductor attached to the shield or armour or the pipe is bent and placed under a jacket of the cable.

17. The transit of claim 12, wherein two ends of the transversal electrical conductor part are placed on top of each other above the semi-cylindrical groove.

18. The transit of claim 12, wherein a number of peelable layers are placed in the semi-cylindrical groove of the module half.

19. The transit of claim 12, further comprising a frame, received in the opening of the partition, and a number of modules placed inside the frame together with a compression unit.

20. The transit of claim 12, wherein the transit has a form of a circular seal placed directly in an opening of the partition or in a sleeve placed in an opening of the partition.

* * * * *

UNITED STATES PATENT AND TRADEMARK OFFICE
CERTIFICATE OF CORRECTION

PATENT NO. : 12,362,548 B2
APPLICATION NO. : 17/786581
DATED : July 15, 2025
INVENTOR(S) : Mikael Grudd It is certified that error appears in the above-identified patent and that said Letters Patent is hereby corrected as shown below:

In the Claims

Column 5, Line 51, In Claim 1, insert --has-- after "halves..."

Column 6, Line 55, In Claim 12, insert --has-- after "halves.."

Signed and Sealed this
Twenty-third Day of September, 2025

John A. Squires
*Director of the United States Patent and Trademark Office*